(12) United States Patent
Amaoka et al.

(10) Patent No.: US 6,237,873 B1
(45) Date of Patent: May 29, 2001

(54) COMPOSITE MATERIAL WING STRUCTURE

(75) Inventors: Kazuaki Amaoka; Hideyuki Sano; Naoya Takizawa, all of Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/338,551

(22) Filed: Jun. 23, 1999

(30) Foreign Application Priority Data

Jun. 23, 1998 (JP) .................................................. 10-176093

(51) Int. Cl.$^7$ ........................................................... B64C 1/00
(52) U.S. Cl. ........................ 244/123; 244/124; 244/35 R; 416/223 R
(58) Field of Search ................................. 244/124, 123, 244/117 R, 35 R; 416/241 R, 241, 299 R, 223 R

(56) References Cited

U.S. PATENT DOCUMENTS 5,501,414 * 3/1996 Bauer ................................... 244/124
5,735,486 * 4/1998 Piening et al. ........................ 244/124
5,848,765 * 12/1998 Gillespie .............................. 244/124

FOREIGN PATENT DOCUMENTS

303360 * 11/1929 (GB) .

* cited by examiner

*Primary Examiner*—J. Woodrow Eldred
(74) *Attorney, Agent, or Firm*—Smith, Gambrell & Russell, LLP

(57) ABSTRACT

A composite material wing structure is disclosed, comprising a plurality of composite material multi-spar structures, each including a plurality of spar extending in a span direction, placed in the span direction. A wing structure of an airplane is also disclosed, comprising wing structures divided into plural parts in a span direction, a rib connected to an end of the wing structure to assemble adjacent wing structures, and a coupling material for coupling spars of the adjacent wing structures.

10 Claims, 8 Drawing Sheets

COMPOSITE MATERIAL WING STRUCTURE

BACKGROUND OF THE INVENTION

1. Field of the Invention

The present invention relates to a composite material wing structure which is applied to, for example, the main wing of an airplane.

2. Description of the Related Art

There are many types of wing structures for airplanes as prior arts as shown in FIGS. 10 to 12 are known. The first example for the structure shown in FIG. 10 is the conventional wing structure made of such various parts as an upper skin 100, an lower skin 101, a front spar 102, a rear spar 103, and a plurality of ribs 104. And these members are permanently connected by various kinds of fasteners. Accordingly, this kind of the wing structure of the airplane has so many components that the assembly becomes very difficult for precisely mating each other because each has an allowable tolerance for manufacturing.

The second example shown in FIG. 11 is a little improved wing structure 115. According to the second type of the structure, first, a box spar is assembled with a front spar 112, a rear spar 113, and ribs 114. And next, the box spar is put on a lower skin 111, then forming a lower structure 115. Finally, an entire wing structure is made by covering the lower structure 115 with an upper skin 116. As a matter of fact, the lower structure 115 is integrally formed, however, it is still a simple concept of an integration of only the front and rear spars and the lower skin. The assembly still requires many jigs.

The third example of the conventional wing structure shown in FIG. 12 is a cross-sectional view where spars 118 are integrally formed on a lower skin 117, and then covered by an upper skin 119 thereon. After that, assembled are a leading edge 120 on the front side, and a trailing edge 121 on the rear side.

According to these conventional assembling methods, there are many drawbacks. That is, It means that the structure requires many assembling jigs not only for making each but also for sub-assembling and/or final assembly of all of them. It causes to become heavier and costlier.

Even though the spars and the ribs are integrally formed in the lower skin as shown in the third example, molding processes with many assembly jigs becomes very complicated and costlier due to many laborious works for laminating many layers of prepregs. Anyway, as either one of the skins must be fastened in the last process, the total cost of making this kind of wing structures becomes high.

It has been well known that a multi-spur integral molding system is less costlier for making the wing structure than the conventional ones shown in FIGS. 10 to 12, however, it is very difficult to make one integral wing structure because some components must receive a heavy load. For example, it is impossible to use such an integral structure for a structural member for bearing the heavy load applied from an aileron, a flap, a spoiler or a landing gear due to lacking the strength thereof.

SUMMARY OF THE INVENTION

An object of the present invention is to provide a composite material wing structure which can overcome the foregoing problems and enables realization of light weight and low cost.

According to the composite material wing structure of the present invention, the manufacture thereof becomes easy by dividing a long wing into several portions. This is attained by dividing a long multi-spar structure made from the composite materials into a plurality of small units of the multi-spar structure. Therefore, each unit of the multi-spar structure is lined up in the span-wise direction.

As both of the multi-spar structure and the skin have each allowable manufacturing tolerance, it is very difficult to precisely assemble all of them by the fasteners. It requires very troublesome fastening works for adjustments to mate each other for making the conventional wing structure. And worse, the structure must be assembled by mating the multi-spar structure with the skin.

For avoiding the above mentioned troublesome works, the present invention can provide a simple manufacturing process without connecting the upper skin thereto. The wing structure of the present invention has a plurality of the spans extending in a span-wise direction, and each of multi spar structures is divided in several groups of cells in the span-wise direction, so that a long wing can be manufactured in a unit.

In the composite material of the present invention, the composite material multi-spar structure is such that a plurality of spars are integrally molded between an upper surface skin and an lower surface skin, so that there is no allowable tolerance of parts or no fastening operation of the upper surface skin, and the manufacturing process becomes simple.

In the composite material wing structure of the present invention, a rib is attached to at least one end of the composite material multi-spar structure in an orthogonal direction to the spar. And, the composite material multi-spar structures are connected to the rib by fastening devices. So that the rib is interposed between the composite material multi-spar structures, whereby the structure can be applied to the main wing of a passenger airplane to which a large load such as a load applied from a flap or a landing gear. Therefore, it enables realization of light weight and low cost.

In the composite material wing structure of the present invention, a vent line extending in the span-wise direction can be formed in the spar itself of the composite material multi-spar structure.

DESCRIPTION OF THE PREFERRED EMBODIMENT

A mode of carrying out the present invention will be described with reference to the drawings.

Figure 1:
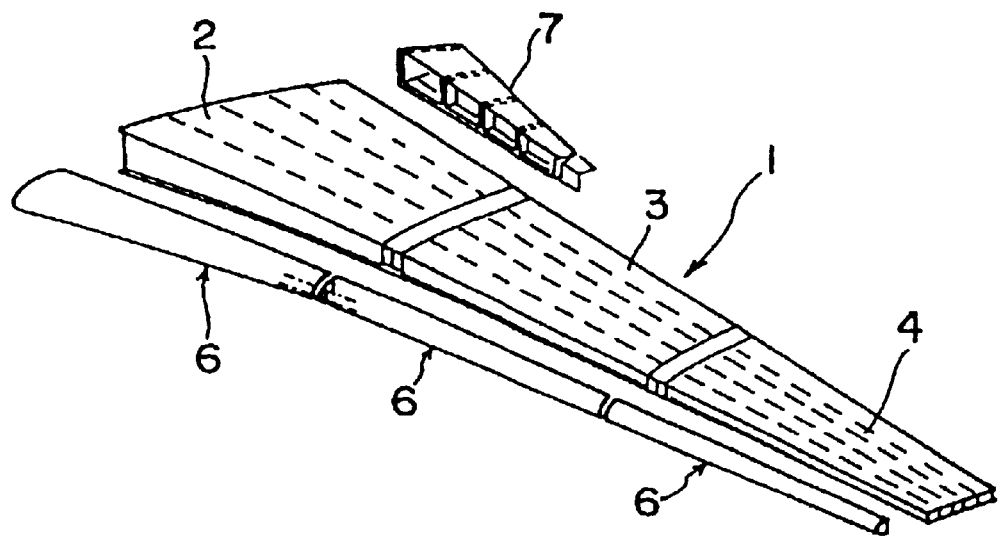
FIG. 1 is an exploded perspective view of a composite material wing structure according to the present invention.

FIG. 1 is a view showing an example in which a composite material wing structure of the present invention is applied to the main wing of an airplane, and this main wing 1 is constituted by coupling three composite material-integrally formed multi-spar structures 2, 3 and 4 to each other. The three composite material-integrally formed multi-spar structures 2, 3 and 4 have shapes in which the wing shape of the main wing is divided into three parts in a span direction. In FIG. 1, although the composite material-integrally formed multi-spar structure is divided into three parts, this can be changed according to an object.

Figure 2:
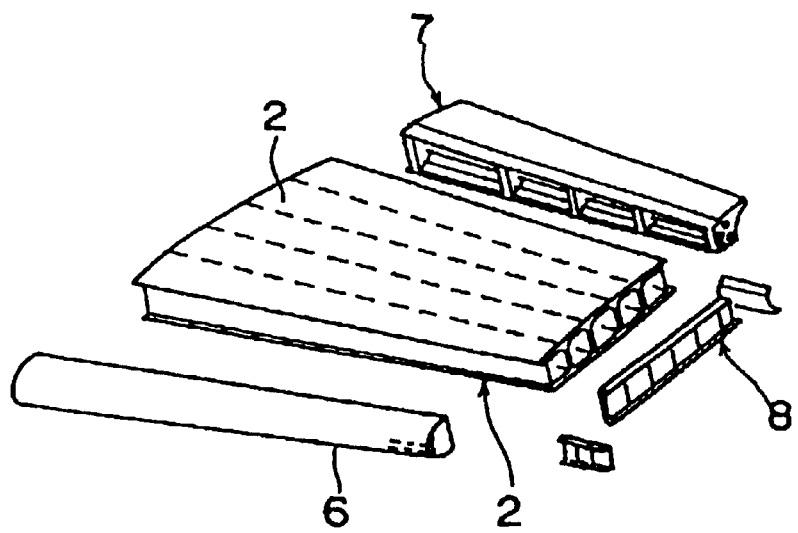
FIG. 2 is an exploded perspective view of a composite material integral molding multi-spar structure.

In the foregoing composite material-integrally formed multi-spar structure 2, as shown in FIG. 2, a front fringe 6 is assembled to a front end, a rear fringe 7 is assembled to a rear end, and a U-shaped end rib (rib) 8 is assembled to a side end. The U-shaped end rib 8 functions also as a power frame for transmitting a large load to the wing structure and as a partition wall of a fuel tank in the wing.

In FIG. 1, the composite material-integrally formed multi-spar structure 2 positioned at the inside, that is, at the body side includes the U-shaped end rib 8 at the side end with a narrow width. The composite material-integrally formed multi-spar structure 3 positioned at the middle includes U-shaped end ribs 8 at both the side ends. The composite material-integrally formed multi-spar structure 4 positioned at the outside includes a U-shaped end rib 8 at the side end with a wide width.

Figure 3:
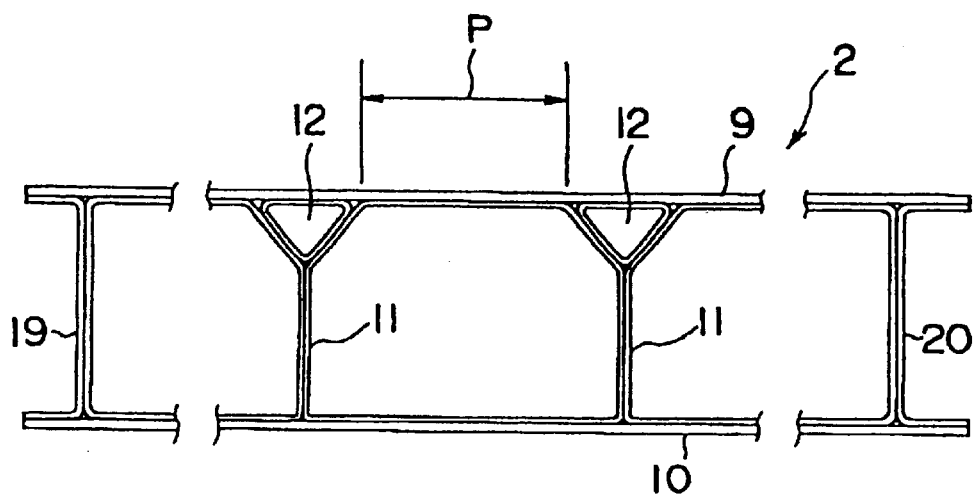
FIG. 3 is a sectional view of a composite material multi-spar structure in a code direction.

Each of the composite material-integrally formed multi-spar structures 2, 3 and 4 includes, as shown in FIG. 3, an upper surface skin 9, an lower surface skin 19, and a plurality of intermediate spars 11, a front spar 9, and a rear spar 20 placed in substantially the same direction between the upper surface skin 9 and the lower surface skin 10. Each of the intermediate spars 11 is substantially Y-shaped, and its forked portion is assembled to the upper surface skin 9. Thus, an air pipe 12 extending in the span direction is formed between the upper surface skin 9 and the forked portion of the intermediate spar 11. This air pipe 12 functions as a vent line of a fuel tank. Since the forked portion of the intermediate spar 11 is jointed to the upper surface skin 9, a pitch P between the upper surface skin 9 and the intermediate spar 11 becomes narrower than a normal I-shaped spar, and the buckling allowable load of the upper surface skin 9 to a compression load is raised, and the strength is also increased.

Figure 4:
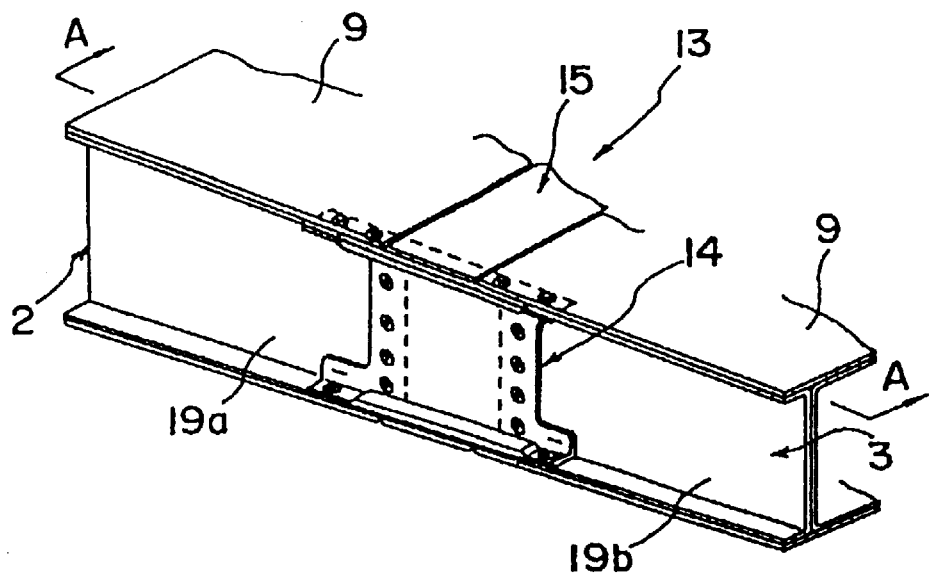
FIG. 4 is a view showing a coupling portion of a front spar of a composite material-integrally formed multi-spar structure.
Figure 5:
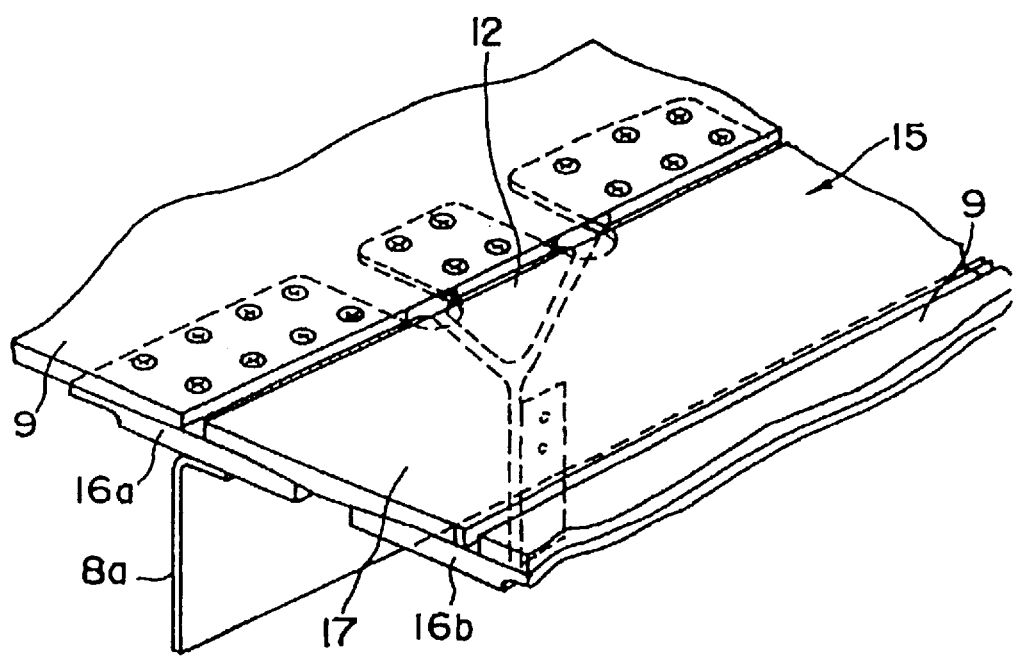
FIG. 5 is a view showing an upper coupling structure of a composite material-integrally formed multi-spar structure.
Figure 6:
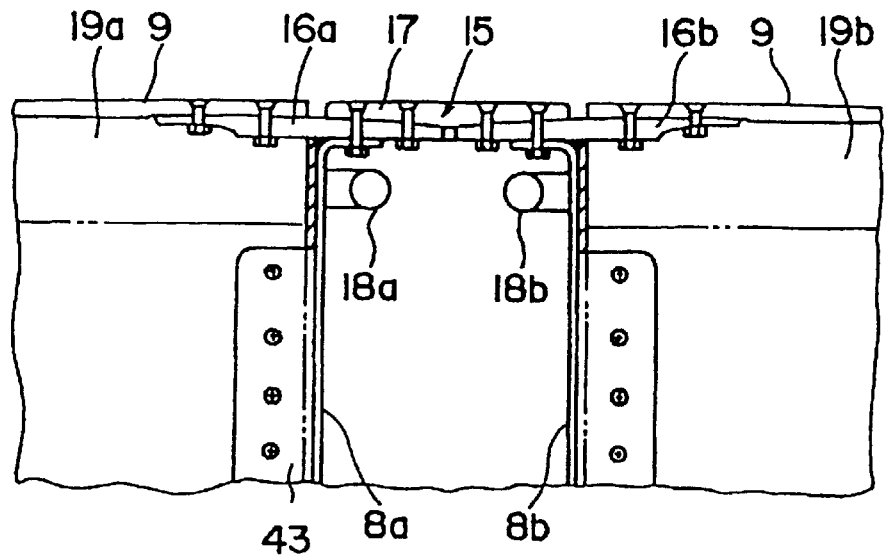
FIG. 6 is a sectional view along line A—A of FIG. 4.

The foregoing composite material-integrally formed multi-spar structure 2 is, as shown in FIGS. 4 to 6, integrally assembled to the composite material-integrally formed multi-spar structure 3 through coupling means 13. Although not shown, similarly, the composite material-integrally formed multi-spar structure 3 is integrally assembled to the composite material-integrally formed multi-spar structure 4 through coupling means 13 with the same structure.

That is, the composite material-integrally formed multi-spar structure 2 and the composite material-integrally formed multi-spar structure 3 and the composite material-integrally formed multi-spar structure 4 are integrally assembled at the end rib 8, the front spar 19, and the rear spar 20 through the coupling means 13. In this case, the end rib 8 functioning as the power frame is provided at the side end of each of the composite material-integrally formed multi-spar structures 2, 3 and 4, and the composite material-integrally formed multi-spar structures 2, 3 and 4 are integrally assembled to each other, so that it becomes possible to realize low cost with a structure which is simple, in which fasteners are greatly reduced, and which can be realized only by the composite material.

The foregoing coupling means 13 includes, as shown in FIGS. 4 to 6, a titanium alloy or aluminum alloy coupling metal fitting 14 for coupling a front spar 19a of the composite material-integrally formed multi-spar structure 2 and a front spar 19b of the composite material-integrally formed multi-spar structure 3, and a coupling metal fitting 15 for coupling an end rib 8a of the composite material-integrally formed multi-spar structure 2 and an end rib 8b of the composite material-integrally formed multi-spar structure 3.

The foregoing coupling metal fitting 14 is a channel-like member with a length bridging over the front spar 19a of the composite material-integrally formed multi-spar structure 2 and the front spar 19b of the composite material-integrally formed multi-spar structure 3, and is assembled to the front spar 19a of the composite material-integrally formed multi-spar structure 2 and the front spar 19b of the composite material-integrally formed multi-spar structure 3 by normal screw means.

The foregoing coupling metal fitting 15 includes, as shown in FIGS. 5 and 6, a coupling plate 16a one end of which is fixed to the front spar 19a of the composite material-integrally formed multi-spar structure 2 and the intermediate portion of which is fixed to the end rib 8a of the composite material-integrally formed multi-spar structure 2, a coupling plate 16b one end of which is fixed to the front spar 19b of the composite material-integrally formed multi-spar structure 3 and an intermediate portion of which is fixed to the end rib 8b of the composite material-integrally formed multi-spar structure 3, and a coupling plate 17 for coupling the coupling plate 16a and the coupling plate 16b. The coupling plate 17 is assembled to the coupling plates 16a and 16b by normal screw means.

Figure 7:
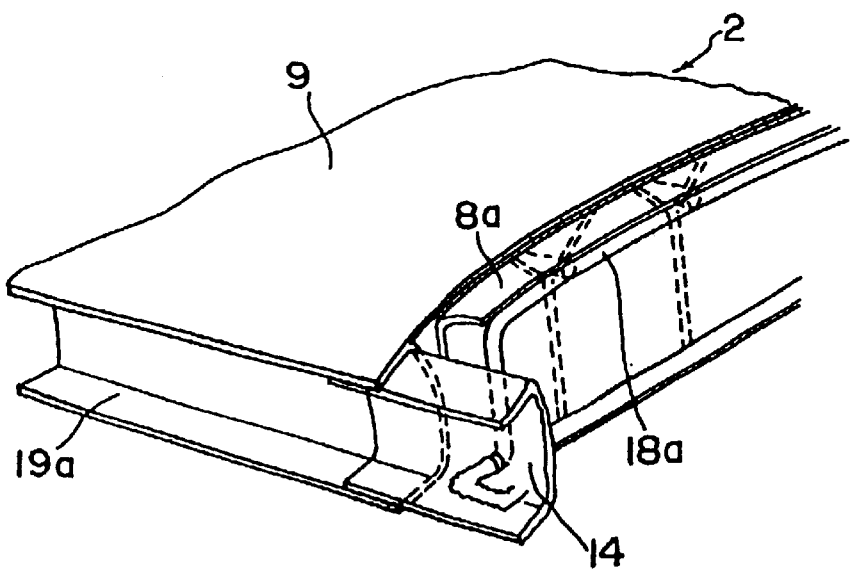
FIG. 7 is a view showing a connecting portion of hydraulic lines made from composite material in the multi-spar structures.
Figure 8A:
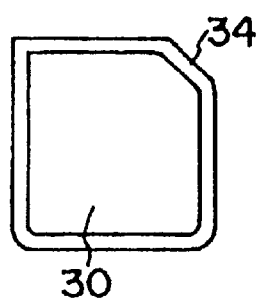
FIG. 8 is a view showing a molding preparation step of the spar.
Figure 8B:
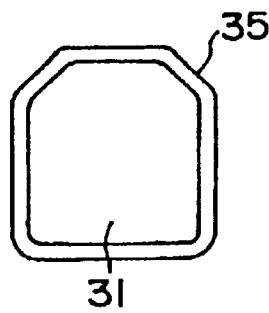
Figure 8C:
Figure 8D:
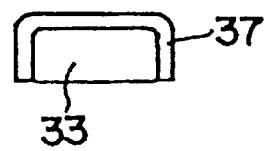

In order to connect the air pipe 12 of the composite material-integrally formed multi-spar structure 2 and the air pipe 12 of the composite material-integrally formed multi-spar structure 3, as shown in FIGS. 6 and 7, a pipe 18a communicating with the air pipe 12 of the composite material-integrally formed multi-spar structure 2 and a pipe 18b communicating with the air pipe 12 of the composite material multi-spar structure 3 are provided, the two pipes 18a and 18b are extended in the code direction of the end rib 8, and the ends of the pipes are assembled to each other by a not-shown coupling tool.

Next, a manufacturing method of the composite material main wing 1 will be described.

First, the composite material-integrally formed multi-spar structures 2, 3 and 4 having shapes in which the wing shape of the main wing is divided into three parts in the span direction are formed. Since the composite material-integrally formed multi-spar structures 2, 3, and 4 have the same structure except that the number of end ribs 8 is one or two, only the composite material-integrally formed multi-spar structure 2 will be described.

Before the formation of the composite material-integrally formed multi-spar structure 2, the upper surface skin 9 and the lower surface skin 10 are formed. The upper surface skin 9 and the lower surface skin 10 are molded in a semi-hardened state in such a manner that a plurality of carbon fiber reinforced composite material (CFPP) prepregs, which are impregnated with thermosetting resin or thermoplastic resin and are cut into such a shape as the wing shape of the main wing divided into the span direction, are prepared, the plurality of prepregs are laid up on a not-shown upper jig and lower jig, the inner space of a bagging sheet is evacuated, and is suitably heated according to the material.

Next, in order to form the intermediate spar 11, the front spar 19, and the rear spar 20, prepregs of carbon fiber reinforced composite material cut into a predetermined size are prepared, and as shown in FIG. 8, the prepregs of the carbon fiber reinforced composite material are laid up on a rectangular section jig 30 with one cut corner, a rectangular section jig 31 with both cut corners, a triangular section jig 32, and a rectangular section jig 33, respectively, the entire is covered with a bagging sheet, and the inside space of the bagging sheet is evacuated, so that a semi-hardened state rectangular hollow laminate 34 with one cut corner, a rectangular hollow laminate 35 with both cut corners, a triangular hollow laminate 36, and a U-shaped laminate 37 are molded. At this time, the upper and under surfaces of the rectangular jigs 30, 31, and 33 and the upper surface of the triangular section jig 32 are formed along the wing shape.

Figure 9:
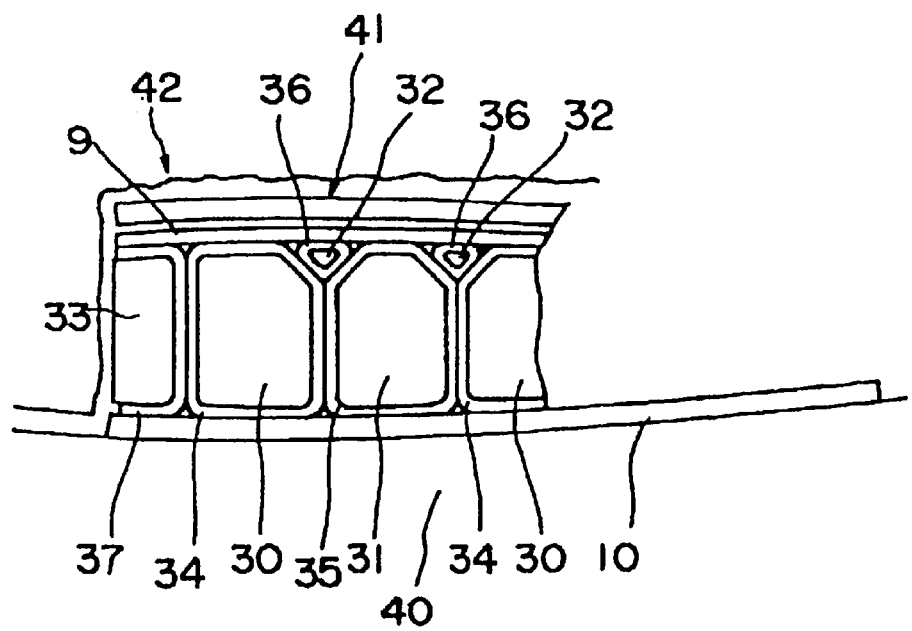
FIG. 9 is a view showing a molding apparatus of a composite material wing structure according to the present invention.
Figure 10:
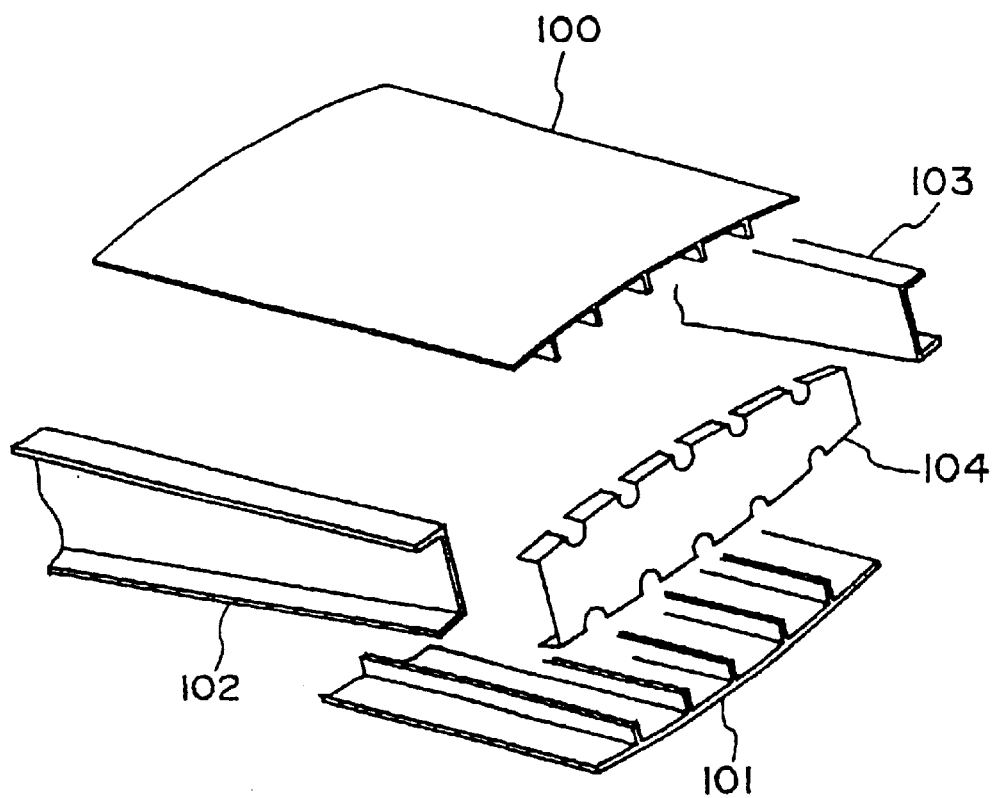
FIG. 10 is a view showing a related art composite material wing structure.
Figure 11:
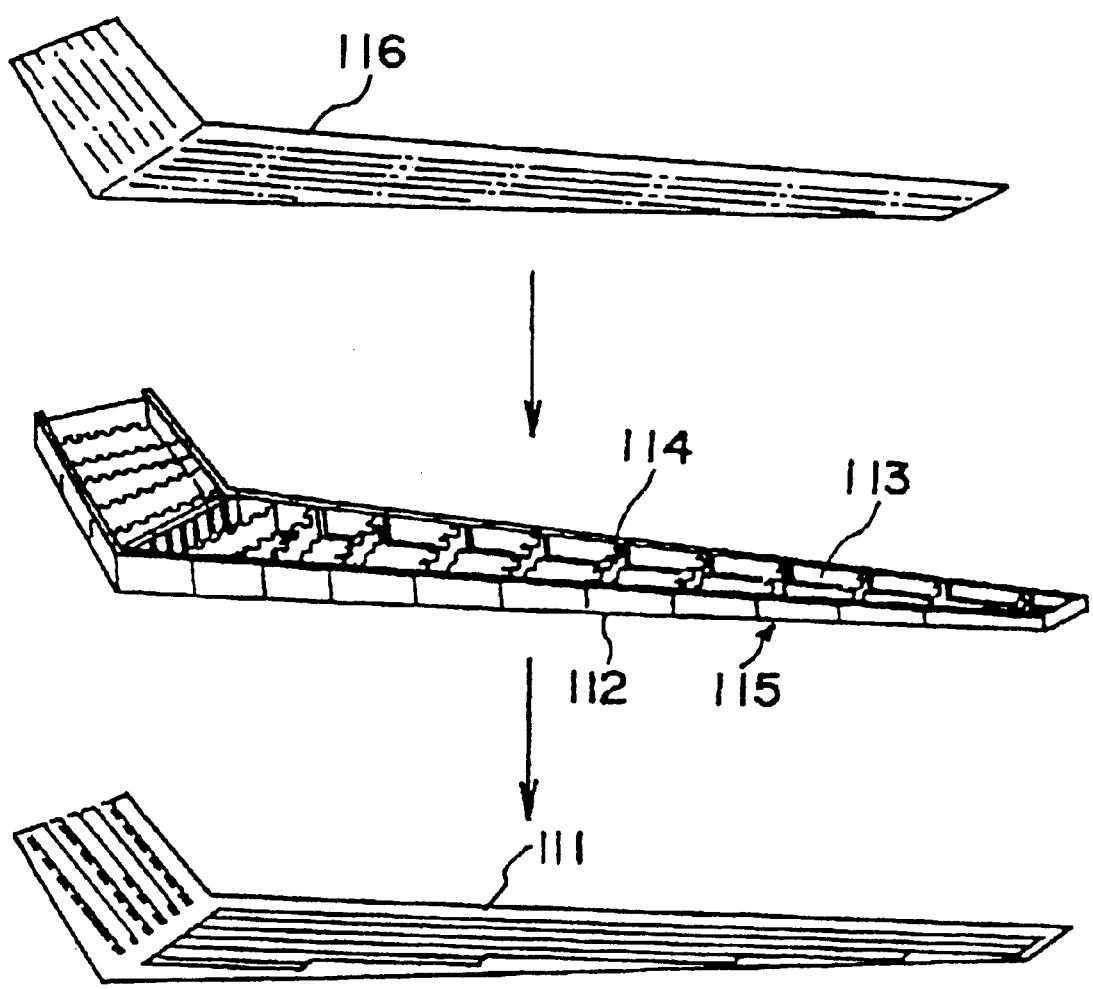
FIG. 11 is a view showing a related art composite material wing structure.
Figure 12:
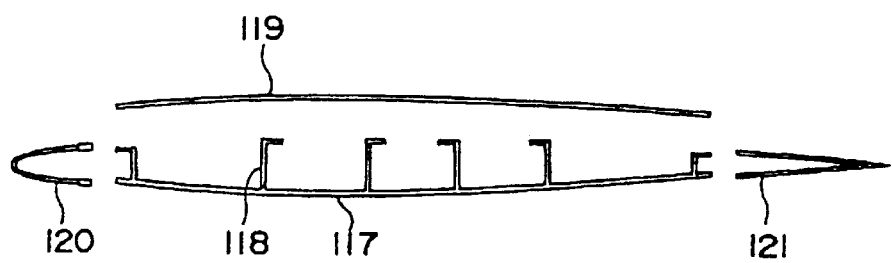
FIG. 12 is a view showing a related art metallic material wing structure.

In order to form the composite material-integrally formed multi-spar structure 2, as shown in FIG. 9, the lower surface skin 10 is placed on a lower jig 40, the rectangular hollow laminate 34 with the one cut corner and the rectangular hollow laminate 35 with both the cut corners are placed on the lower surface skin 10 so that the cut portions are opposite to each other, the triangular hollow laminate 36 is placed in the space formed by the cut portions, the U-shaped laminate 37 for forming the front spar 19 and the U-shaped laminate 37 for forming the rear spar 20 are arranged before and after this, the upper surface skin 9 is placed thereon, an upper jig 41 is placed on the upper surface skin 9, the entire of these are covered with a bagging sheet 42, the inner space of the bagging sheet 42 is evacuated, and is heated and pressurized in an autoclave at 180° C. for two hours to harden them. This temperature and pressure can be suitably determined according to composite materials used. Thereafter, the rectangular section jigs 30 and 31 and the triangular section jig 32 are drawn out, so that the composite material-integrally formed multi-spar structure 2 is molded.

Next, coupling of the composite material-integrally formed multi-spar structure 2 and the composite material-integrally formed multi-spar structure 3 will be set forth, and coupling between the composite material-integrally formed multi-spar structures will be described.

Here, the U-shaped end rib 8, the coupling plate 16, the coupling metal fitting 17, and the coupling metal fitting 18 are manufactured by cutting and working a titanium alloy or aluminum alloy material, a through hole of a screw for coupling and so on is provided in the U-shaped end rib 8, the coupling plate 16, the coupling metal fitting 17, and the coupling metal fitting 18, a nut and the like is also fixed, and a not-shown through hole is provided in the end rib 8 at a portion corresponding to the vent line 12.

First, one side of an L-shaped stiffener 43 made of titanium alloy, aluminum alloy, or fiber reinforced composite material is fixed to the spars 11, 19, and 20 of the composite material-integrally formed multi-spar structure 2 with fasteners, and the U-shaped end rib 8a is assembled to the other side of the stiffener 43 with a blind fastener or the like while the opening portion thereof is directed outward. At this time, a sealant is applied between the spars 11, 19, and 20 and the web of the U-shaped end rib 8a to eliminate the gap. Similarly, the coupling plate 16b, the U-shaped end rib 8b, and the pipe 18b are attached also to the composite material-integrally formed multi-spar structure 3.

In order to assemble the composite material-integrally formed multi-spar structure 2 and the composite material-integrally formed multi-spar structure 3, the composite material-integrally formed multi-spar structure 3 is placed adjacently to the side of the U-shaped end rib 8a of the composite material-integrally formed multi-spar structure 2, the pipe 18a is communicated with each of the pipes 12 of the composite material-integrally formed multi-spar structure 2, the pipe 18b is communicated with each of the air pipes 12 of the composite material-integrally formed multi-spar structure 3, the pipe 18a communicated with the pipe 12 of the composite material-integrally formed multi-spar structure 2 and the pipe 18b communicated with the pipe 12 of the composite material-integrally formed multi-spar structure 3 are extended in the code direction of the end rib 8 to a place before the front spar or behind the rear spar, and pipe ends are assembled to each other by a not-shown coupling tool. By this, each of the air pipes 12 of the composite material-integrally formed multi-spar structure 2 and each of the air pipes 12 of the composite material-integrally formed multi-spar structure 3 are communicated with each other. Coupling of the air pipe 12 and the air pipe 18 is carried out such that a flange is provided at the tip end of the air pipe 18, and this flange is fastener assembled to the portion of the not-shown through hole of the end rib 8a.

Next, the coupling plate 16a is assembled to the upper surface skin 9 of the composite material-integrally formed multi-spar structure 2, the coupling plate 16b is assembled to the upper surface skin 9 of the composite material-integrally formed multi-spar structure 3, and the coupling plate 16a and the end rib 8a, and the coupling plate 16b and the end rib 8b are assembled with the coupling plate 17. At the same time, the front spar 19a of the composite material-integrally formed multi-spar structure 2 and the front spar 19b of the composite material-integrally formed multi-spar structure 3 are assembled by the coupling metal fitting 14, and the rear spar 20a and the rear spar 20b are assembled by the coupling metal fitting 14. By this, the composite material-integrally formed multi-spar structure 2 and the composite material-integrally formed multi-spar structure 3 are integrally assembled. The interval between the upper surface skin 9 and the coupling metal fitting 17 and the interval between the lower surface skin 10 and the coupling metal fitting 17 are set to be sufficiently narrow, and a sealant is inserted to make airtight.

Alternatively, although not shown, by providing a suitable operation hole in the under surface coupling plate, the front spar coupling metal fitting, or the rear spar coupling metal fitting, the pipe 12 of the composite material-integrally formed multi-spar structure 2 and the pipe 12 of the composite material-integrally formed multi-spar structure 3 can be directly assembled to each other.

In this way, by integrally coupling the composite material-integrally formed multi-spar structures 2, 3 and 4 in which the wing shape of the main wing is divided into three parts in the span direction, the composite-material mainwing 1 is formed. In this case, the main wing 1 is made composite material-integrally formed multi-spar structures in which the wing is divided into plural parts, so that each of the composite material-integrally formed multi-spar structures can be molded by an existing equipment.

As described above, according to the present invention, a plurality of composite material multi-spar structures each including a plurality of spars extending in the span direction are placed in the span direction, so that the structural elements are simplified, the number of parts is reduced, and the molding becomes easy. Further, the main wing with a long wing length can be molded by an existing equipment.

Moreover, since ribs are provided at side ends of the plurality of composite material-integrally formed multi-spar structures, necessary strength can be secured.

While the presently preferred embodiments of the present invention has been shown and described, it is to be understood that the disclosure is for the purpose of illustration and that various changes and modifications may be made without departing from the scope of the invention as set forth in the appended claims.

What is claimed is:

1. A wing structure comprising:
   a leading edge portion provided in a front portion of said wing structure for extending in a spanwise direction thereof and for initially separating a circumfluent fluid to an upper surface and a lower surface thereof when said circumfluent fluid flows on both surfaces in a chord direction,
   an inter-spar structure connected to a rear end of said leading edge portion for extending in said spanwise direction, and
   a trailing edge portion connected behind said main inter-spar structure portion for forming a rear edge portion of said wing structure in said spanwise direction,
   wherein
   said inter-spar structure is divided into a plurality of multi-spar structure portions in said spanwise direction, and each is made from a composite material;
   an upper skin is provided on each of said inter-spar structure portion for forming a smooth and continuous inter-spar surface from said upper surface of said leading edge portion to an upper side of said trailing edge portion;
   a lower skin is provided under said multi-spar structure portion for forming an lower continuous surface from said lower surface of said leading edge portion to a lower side of said trailing edge portion;
   a front spar is provided between said leading edge portion and said multi-spar structure portion and between said upper and lower skins for connecting said leading edge portion; and
   a rear spar is provided between said multi-spar structure portion and said trailing edge portion and between said upper and lower skins for connecting said trailing edge portion with said multi-spar structure portion so as to easily and accurately manufacture said wing structure with a long span by dividing said multi-spar structure portion into a plurality of units.

2. The wing structure according to claim 1, further comprising:
   a plurality of inter-spars integrally formed in said multi-spar structure portion between said front and rear spars and interposed between said upper skin and said lower skin.

3. The wing structure according to claim 1, further comprising:
   a rib provided in said multi-spar structure portion in said chord direction and orthogonally connected to at least either end of said front or rear spar.

4. The wing structure according to claim 2, further comprising:
   a vent line formed in said inter-spar in said span direction.

5. The wing structure according to claim 1, further comprising:
   joint means interposed between said upper skins and between said lower skins for connecting components of said wing structure at appropriate connection points in order to precisely and strongly assemble said wing structure at a low cost.

6. The wing structure according to claim 2, wherein:
   each of said inter-spars is substantially Y-shaped, and a forked portion of said Y-shaped is assembled to said upper skin.

7. The wing structure according to claim 2, wherein:
   each of said inter-spars is substantially Y-shaped, a forked portion of said Y-shaped is assembled to said upper skin, and a vent line extending in the span direction is formed between said upper skin and said forked portion.

8. The wing structure according to claim 5, wherein:
   said joint means includes
   a first fitting formed as a channel-like member with a length bridging over said front spar of a first multi-spar structure and said front spar of a second multi-spar structure for coupling thereof, and
   a second fitting for coupling said rib of a first multi-spar structure and said rib of a second multi-spar structure,
   said second fitting includes
   a first coupling plate fixed to said front spar of said first multi-spar structure and said rib of said first multi-spar structure,
   a second coupling plate fixed to said front spar of said second multi-spar structure and said rib of said second multi-spar structure, and
   a third coupling plate for coupling said first coupling plate and said second coupling plate.

9. A wing structure having, a leading edge portion provided in a front portion of said wing structure for extending in a spanwise direction of said wing structure thereof and for initially separating a circumfluent fluid to an upper surface and a lower surface thereof when said circumfluent fluid flows on both surfaces in a chord direction, an inter-spar structure connected to a rear end of said leading edge portion for extending in said spanwise direction, and a trailing edge portion connected behind said main inter-spar structure portion for forming a rear edge portion of said wing structure in said spanwise direction, comprising:
   a plurality of multi-spar structure portions formed by dividing said inter-spar structure into several portions in said spanwise direction, each multi-spar structure portion is made from a composite material, and
   a joint for connecting said multi-spar structure portions to assemble said wing structure precisely and strongly,
   wherein said multi-spar structure includes;
   an upper skin provided on each of said multi-spar structure portion for forming a smooth and continuous inter-spar surface from said upper surface of said leading edge portion to an upper side of said trailing edge portion;
   a lower skin provided under each of said multi-spar structure portion for forming a lower continuous surface from said lower surface of said leading edge portion to a lower side of said trailing edge portion;
   a front spar provided between said leading edge portion and said multi-spar structure portion and between said upper and lower skins for connecting said leading edge portion; and a rear spar provided between said multi-spar structure portion and said trailing edge portion and between said upper and lower skins for connecting said trailing edge portion with said multi-spar stricture portion.

10. A method of making a wing structure having a leading edge portion provided in a front portion of said wing structure for extending in a spanwise direction thereof and for initially separating a circumfluent fluid to an upper surface and a lower surface thereof when said circumfluent fluid flows on both surfaces in a chord direction, an inter-spar structure connected to a rear end of said leading edge portion for extending in said spanwise direction, and a trailing edge portion connected behind said main inter-spar structure portion for forming a rear edge portion of said wing stricture in said spanwise direction, comprising:

dividing said inter-spar structure into a plurality of multi-spar structure portions in said spanwise direction;

providing an upper skin on each of said multi-spar structure portions for forming a smooth and continuous inter-spar surface from said upper surface of said leading edge portion to an upper side of said trailing edge portion;

attaching a lower skin under said multi-spar structure portion for forming a lower continuous surface from said lower surface of said leading edge portion to a lower side of said trailing edge portion;

putting a front spar between said leading edge portion and said multi-spar structure portion and between said upper and lower skins for connecting said leading edge portion; and installing a rear spar between said multi-spar structure portion and said trailing edge portion and between upper and lower skins for connecting said trailing edge portion with said multi-spar structure portion so as to easily and accurately manufacture said wing structure with a long span by dividing said main itner-spar structure portion into a plurality of units.

* * * * *